United States Patent
Weber (10) Patent No.: US 7,129,825 B2
(45) Date of Patent: *Oct. 31, 2006

(54) ACTION RECOMMENDATION SYSTEM FOR A MOBILE VEHICLE

(75) Inventor: James R. Weber, Lacon, IL (US)

(73) Assignee: Caterpillar Inc., Peoria, IL (US)

( * ) Notice: Subject to any disclaimer, the term of this patent is extended or adjusted under 35 U.S.C. 154(b) by 113 days.

This patent is subject to a terminal disclaimer.

(21) Appl. No.: 10/864,203

(22) Filed: Jun. 9, 2004

(65) Prior Publication Data

US 2005/0024189 A1 Feb. 3, 2005

Related U.S. Application Data (63) Continuation-in-part of application No. 09/669,976, filed on Sep. 26, 2000, now Pat. No. 6,822,557.

(51) Int. Cl.
*B60Q 1/00* (2006.01)

(52) U.S. Cl. .................. 340/425.5; 340/438; 340/439

(58) Field of Classification Search ............. 340/425.5
See application file for complete search history.

(56) References Cited

U.S. PATENT DOCUMENTS

| | | | |
|---|---|---|---|
| 4,125,894 A | 11/1978 | Cashel et al. ............... 701/123 |
| 4,270,174 A | 5/1981 | Karlin et al. ............... 701/115 |
| 4,271,402 A | 6/1981 | Kastura et al. ............. 340/459 |
| 4,751,633 A | 6/1988 | Henn et al. ................... 714/18 |
| 5,050,080 A | 9/1991 | Abe ............................. 701/35 |
| 5,608,632 A | 3/1997 | White ......................... 701/103 |
| 5,794,164 A | 8/1998 | Beckert et al. ............ 455/3.06 |
| 5,819,201 A | 10/1998 | DeGraaf ..................... 701/208 |
| 5,884,210 A | 3/1999 | Rettig et al. ............... 701/115 |
| 5,914,654 A | 6/1999 | Smith ......................... 340/438 |
| 5,917,408 A | 6/1999 | Cardillo et al. ............ 340/439 |
| 5,968,107 A | 10/1999 | Vogan et al. ............... 701/102 |
| 5,983,156 A | 11/1999 | Andrews .................... 701/115 |
| 5,990,805 A | 11/1999 | Wicks et al. .............. 340/7.48 |
| 6,018,293 A | 1/2000 | Smith ......................... 340/438 |
| 6,101,381 A | 8/2000 | Tajima et al. ............ 455/414.2 |
| 6,154,658 A | 11/2000 | Caci ........................... 455/466 |
| 6,157,814 A | 12/2000 | Hymel et al. ............. 340/7.56 |
| 6,243,030 B1 | 6/2001 | Levine .................. 340/995.12 |
| 6,282,464 B1 | 8/2001 | Obradovich ................... 701/1 |
| 6,330,499 B1 | 12/2001 | Chou et al. .................. 701/33 |
| 6,353,785 B1 * | 3/2002 | Shuman et al. ............. 701/48 |
| 6,411,207 B1 * | 6/2002 | Shaffer ....................... 340/521 |
| 6,822,557 B1 * | 11/2004 | Weber ..................... 340/425.5 |

OTHER PUBLICATIONS

Terion FleetView Product Brochure, retrieved from Internet on Jul. 20, 2000.

* cited by examiner

*Primary Examiner*—Donnie L. Crosland
(74) *Attorney, Agent, or Firm*—W. Bryan McPherson; Finnegan,Henderson, Farabow,Garrett&Dunner (57) ABSTRACT

Specific advertisements and other information can be communicated to the user of a mobile vehicle depending on the vehicles or occupants needs or preferences.

25 Claims, 5 Drawing Sheets

ACTION RECOMMENDATION SYSTEM FOR A MOBILE VEHICLE

This application is a continuation-in-part of U.S. application Ser. No. 09/669,976 filed Sep. 26, 2000, now U.S. Pat. No. 6,822,557.

TECHNICAL FIELD

This invention is directed to advertising and information display systems, and more particularly to advertising, and informative displays for mobile vehicles.

BACKGROUND

Owners and operators of trucks and other mobile vehicles often travel to areas with which they are unfamiliar. Even in areas with which they are familiar, there are often nearby resources for obtaining goods and services for their vehicles, and for other purposes, of which they are unaware.

Conversely, dealers of trucks and other automotive products and services incur enormous costs in advertising their products. Unfortunately, much of this expense is wasted when a large percentage of the audience exposed to their radio, print, or other media-based advertisements may have no need or desire for the product or service advertised, because they do not own the particular type of vehicle for which the product or service is available, or their vehicle does not currently need the particular product or service, or because they are not located near (or do not know they're located near) a convenient source for the advertised product or service.

It would be advantageous for vehicle owners and operators to be made aware of potential needs that their vehicle might require, and also of nearby resources for satisfying that need. It would also be mutually advantageous for vehicle manufacturers and/or dealers, as well as for owners and operators, if a vehicle occupant could be alerted to these possible needs by means of an advertisement or other message directing the vehicle operator to a particular service center, store, or other resource in the vicinity of the vehicle.

Conventional systems are available that can tell the driver of the vehicle his position, and there are systems that can provide maps to desired destinations. However, these systems do not focus the available information to the needs of the driver. Conventional systems are available that alert a driver if there is a problem with his vehicle. And of course, conventional systems are available to direct advertising at vehicle drivers (e.g., billboards, commercial radio, etc.).

However, no systems are available that choose and communicate advertising or advisory messages to a driver based on some physical attribute of the vehicle (e.g., type of vehicle, condition of vehicle, etc.), the vehicle's position, and/or need of the operator. Such a system would allow precise targeting of advertisements and/or advisory messages.

The invention is directed toward addressing one or more of the above concerns.

SUMMARY OF THE INVENTION

In one aspect of the present invention, a method of providing advertisements to an occupant of a mobile vehicle is disclosed. The method includes the steps of determining at least one of a vehicle status data, an occupant status data, and an environmental status data, and communicating an advertisement to said occupant in response to said at least one vehicle status data, occupant status data, and environmental status data.

In another aspect of the present invention, a method of providing an advertisement to an occupant of a mobile vehicle is disclosed. The method includes the steps of determining at least one of a vehicle profile, an occupant profile, and an environment profile, and communicating said advertisement to said occupant in response to said at least one of said vehicle profile, said occupant profile, and said environment profile.

BRIEF DESCRIPTION OF THE DRAWINGS

The invention is described herein with reference to the drawing of an embodiment of the invention, in which.

DETAILED DESCRIPTION

Figure 1:
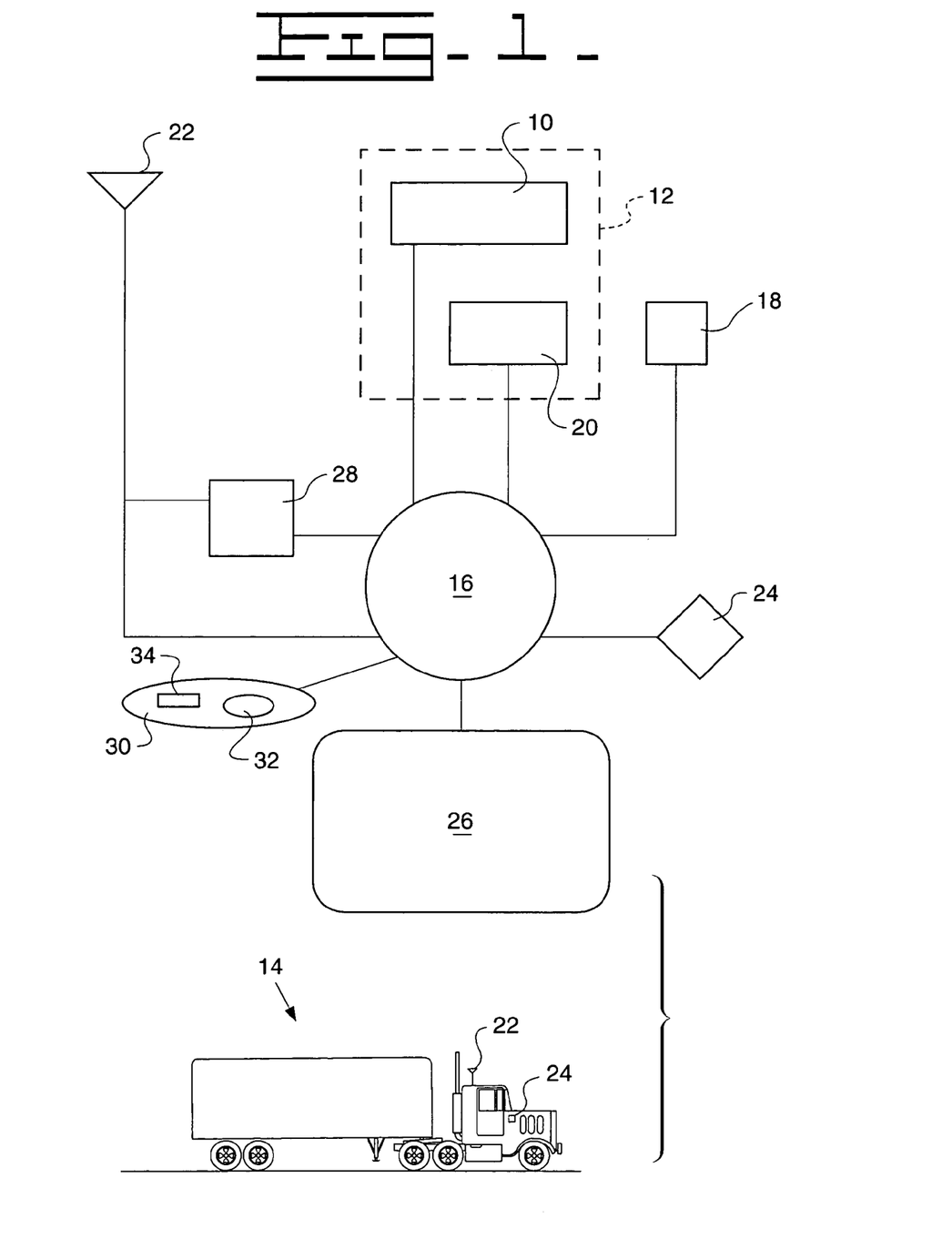
FIG. 1 is a functional flowchart representative of data flow connections between modules utilizing an action recommendation system according to the invention.

In one embodiment of the invention, with reference to FIG. 1, a display 10 of a user interface 12 in a mobile vehicle 14 can receive or display 10 a message from an ECM 16 to an occupant of the vehicle 14. In other embodiments a speaker 18 in addition to or in place of the display 10 could be used to audibly announce the message. The user interface 12 can also include one or more input devices 20, for example a keyboard, touch pad, mouse, microphone, etc., for allowing the occupant to input data to the ECM 16. The mobile vehicle could include an automobile, truck, motorcycle, airplane, aquatic craft (e.g., boats etc.).

The ECM 16 can receive data from the user interface 12. The ECM 16 can also receive data from a receiver/transceiver 22, a data input port 24, an engine 26 of the vehicle 14, and/or a vehicle position detecting device 28 for example. The ECM 16 also communicates with a memory 30. The memory 30 includes a database 32 containing resource data. A program for operating the ECM 16, a computer software program for example, can also be stored in the memory 30.

Figure 2:
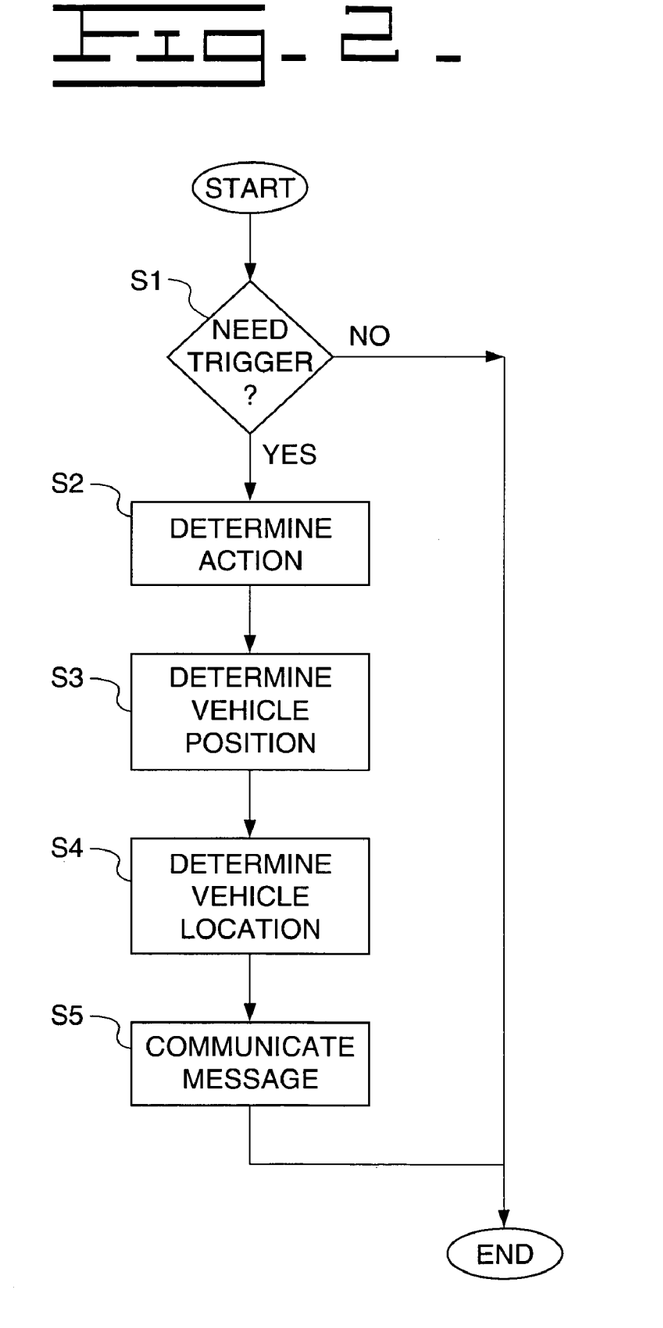
FIG. 2 is a logical flowchart representing steps in performing an embodiment of the method of the invention.

FIG. 2 illustrates a method for operating the ECM 16 with a computer program for example embedded in a portion of the memory 30 according to one embodiment. Step S1 is to determine that a need trigger has occurred. No further action takes place until a need trigger is detected. Once the need trigger is detected, step S2 is to determine a recommended course of action depending on the nature of the event trigger. Step S3 is to determine a vehicle position. Step S4 is to determine a preferred location (if any) for accomplishing the recommended course of action, based on the vehicle position. Step S5 is to communicate to the vehicle occupant a message indicative of the recommended course of action and the preferred location (if any) for accomplishing the recommended course of action. The order of steps can be varied. S2 can be performed after S3 for example.

Periodically, the memory 30 can be managed with updating or other functions, which may be performed in the alternative or concurrently. These functions are now described with reference to FIG. 3, which shows a sample order for performing functions. Step S6 is to update the memory 30 with information from the data input port 24 on the vehicle 14. Step S7 is to update the memory 30 with information received through the receiver/transceiver 22 via a pager network. Step S8 is to update the memory 30 with information received via the receiver/transceiver 22 via the Internet. Step S9 is to update the memory 30 with information received through the receiver/transceiver 22 via transmitting or broadcasting stations that supply data to systems utilizing the invention.

Figure 4:
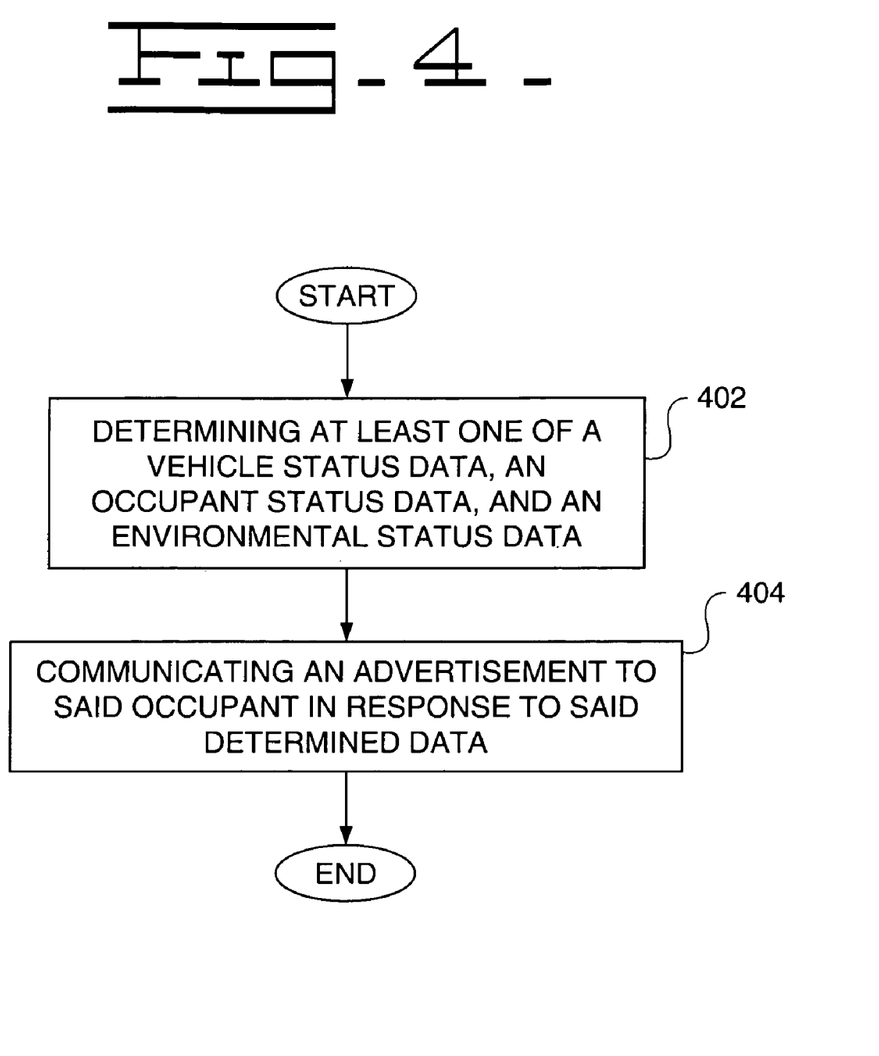
FIG. 4 illustrates one method of providing advertisements to an occupant of a mobile machine.

FIG. 4 illustrates a method of providing advertisements to an occupant of a vehicle. In a first control block 402 at least one of a vehicle, occupant, and environmental status data are determined. In a second control block, 404, an advertisement is communicated to the occupant in response to the determined data. For example, the vehicle may include a user (occupant) interface, e.g. a display and associated user input device such as a keypad or touch screen display. The vehicle also includes a processor connected to the user interface. The processor may be connected to additional hardware (e.g., transceiver) enabling the processor to communicate with off-board (or off-vehicle) resources. In addition, the processor may communicate with one or more vehicle systems, or components that monitor the vehicle systems, such as the engine, transmission, tires, cooling components, etc. The processor may also be configured to monitor occupant characteristics, such as fatigue characteristics. In each of these instances, the processor may include one or more processors and/or memory to perform these functions, and communicate with one or more processors and/or memories on the vehicle in order to perform these functions. Therefore, the processor system is able to determine vehicle status data, which may include indications of fuel status (e.g., low fuel, fuel consumption rate, predicted driving distance based on fuel consumption rate etc.), tire status (e.g., low pressure etc.), oil status (e.g., low oil pressure, low oil quantity etc.), cooling status (e.g., engine temperature etc.), and other conditions of the vehicle. In addition, the processor system is able to determine occupant status data, such as fatigue characteristics (e.g., duration of vehicle travel since last stop, driving characteristics (e.g., steering characteristics), on-board sensors monitoring the driver for fatigue, e.g., head nodding etc.). In addition, the processing system is able to determine environmental data. For example, the processor may receive inputs from an off-board resource indicating characteristics associated with road conditions, such as detours or traffic delays. In addition, the processor system may receive weather characteristics or reports, e.g., indicating rain, high winds, adverse weather and advisories, etc.

An advertisement may be communicated to an occupant in response to the vehicle, occupant, and/or environmental data that is determined. For example, in one embodiment, the processor may establish a recommended course of action. With respect to vehicle status data, the recommended course of action may be that fuel is needed within a certain number of miles, or that a particular vehicle component is showing wear or has failed and needs replacing. With respect to occupant data, the recommended course of action may be to acquire lodging, or to stop for food (e.g., to wait out a storm). A recommended course of action based on environmental data may include determining to stop for lodging or food based on traffic or weather conditions. The recommendation may include recommending acquiring fuel based on traffic delays or detours.

An advertisement may be identified in response to the recommended course of action. That is, the system supports need based advertising. Once a particular need (or potential need) is established, the processor may identify what potential solutions are available, and what potential advertisements are available. The process may receive, or access, a plurality of advertisements, and then select one of more of the advertisements to be communicated to the occupant based on the determined vehicle, occupant, and/or environmental data, and/or the recommended course of action. In one embodiment, a local repository may be stored in memory that includes a plurality of advertisements. The processor may access the repository (thereby receiving a plurality of advertisements), and determine which advertisements are associated with the particular data and/or recommended course of action that has been determined. For example, if vehicle status data indicates fuel, oil or tire pressure are low, advertisements associated with vehicle service centers may be identified for communicating to the occupant. In one embodiment, the advertisements may be further down-selected based on the current location of the vehicle in comparison with the location of the organization identified in the advertisement. The current location may be established based on GPS signals received from off-board resources. Alternatively, the advertisements may be down-selected based on a predicted path of the vehicle. For example, the occupant may have entered a destination, or a planned route into the processor (e.g., via the user interface). If a destination was entered, the process may establish the planned route through on-board/off-board mapping tools. In addition, the predicted (or planned) route may be determined based on the destination, the predicted route, and the current location of the vehicle which may be used to confirm the planned route. Based on this information, advertisements may be identified that correlate with the data and/or recommended course of action, and the predicted location of the vehicle when an action is recommended. For example, if fuel is recommended in the next ten miles, then advertisements for vehicle service centers located on the planned path for the next ten miles may be selected for communication to the occupant. Alternatively, if bad weather is expected, based on weather updates, then depending on the time of day, advertisements for lodging may be provided to the occupant based on the location of the bad weather and the planned path. For example, advertisements for lodgings located on the planned path, but prior to the bad weather may be identified.

As mentioned, the advertisements may be located on-board the vehicle, e.g., in an updateable repository stored in memory. Alternatively, the advertisements may be received from one or more off-board resources. For example, there may be a satellite communication service that generates advertisement information. The vehicle may be connected to wireless gateway such that it is connected to the internet, and receives advertisements via searching routines etc. In one embodiment, there may be a localized wireless capability for transmitting advertisements for local businesses to vehicles within a specified radius. In another embodiment, electronic billboards may be established, such that any organization may establish a transmitting device along a road, e.g., interstate, to transmit advertisements within a small radius, to passing cars. The on-board processor may receive these signals and determine if any of the correlate to the specific needs of the vehicle/occupant. Based on this process, one or more of the advertisements may be communicated to the occupant of the vehicle.

In one embodiment, the on-board process may determine a need for a particular service or product (e.g. based on the vehicle/occupant/environmental data and/or recommended course of action), and then send a signal off-board to request information (which may include advertisements) associated with the particular need. In response to this request, one or more off-board resources may communicate information, which may include advertisements, to the vehicle.

In one embodiment, the advertisement communicated to the occupant may be customized to either the occupant or vehicle, in response to a prior purchase. For example, based on historical information, e.g., a prior purchase of the product or services from the business by the occupant or a former occupant of the vehicle, a discount may be provided to this specific occupant or vehicle. When a product or service is purchased, information associated with the purchase may be collected, e.g., a product or service purchased, a purchaser identifier and/or a vehicle identifier etc. The information may be stored in an off-board repository (e.g. maintained by the business). Alternatively, or in addition, the information may be stored on-board the vehicle also. For example, the information may be electronically communicated to the vehicle from the business computing system. Alternatively, the information may be manually entered into the on-board processor, e.g., via the user interface. Then, the next time the occupant or vehicle needs the same product or service, the advertisement received by the vehicle may be customized for the particular occupant/vehicle to reflect the prior purchase. For example, if the processor requests advertisements be delivered to the vehicle, then the off-board source(s) sending the information would be able to correlate the purchasing history of the occupant/vehicle (via the repository maintained by the business) with available discounts, customize the advertisement accordingly, and deliver the advertisement to the vehicle.

In an alternative embodiment, the advertisement information delivered to the vehicle may include potential discounts available for prior purchasers (e.g., one prior purchase: 10% off, two prior purchases: 20% off etc.). The on-board processor may receive this and correlate this advertisement with prior purchasing information stored on the vehicle. Then the advertisement may be customized based on the prior purchasing information on the vehicle or occupant, and provided to the occupant.

In one embodiment, the on-board processor may track the advertisements provided to the occupant, and the resulting course of action. For example, the occupant or maintenance personnel may enter, via the user interface, the selected course of action. The processor may correlate this information with the associated advertisements provided to the operator. The on-board processor may use this information to assist in the future identification of advertisements to communicate to the operator. For example, the processor may determine a trend, that the occupant purchases Brand X 75% of the time, and has yet to purchase Brand Y. Therefore, the processor may prioritize the advertisements to the occupant based on prior purchases. The processor may prevent some advertisements from being communicated to the occupant because the product or service has never been purchased. In this manner, the on-board processor in-effect learns the preferences of the occupant and identifies advertisements to communicate to the occupant accordingly, when the need arises.

Figure 5:
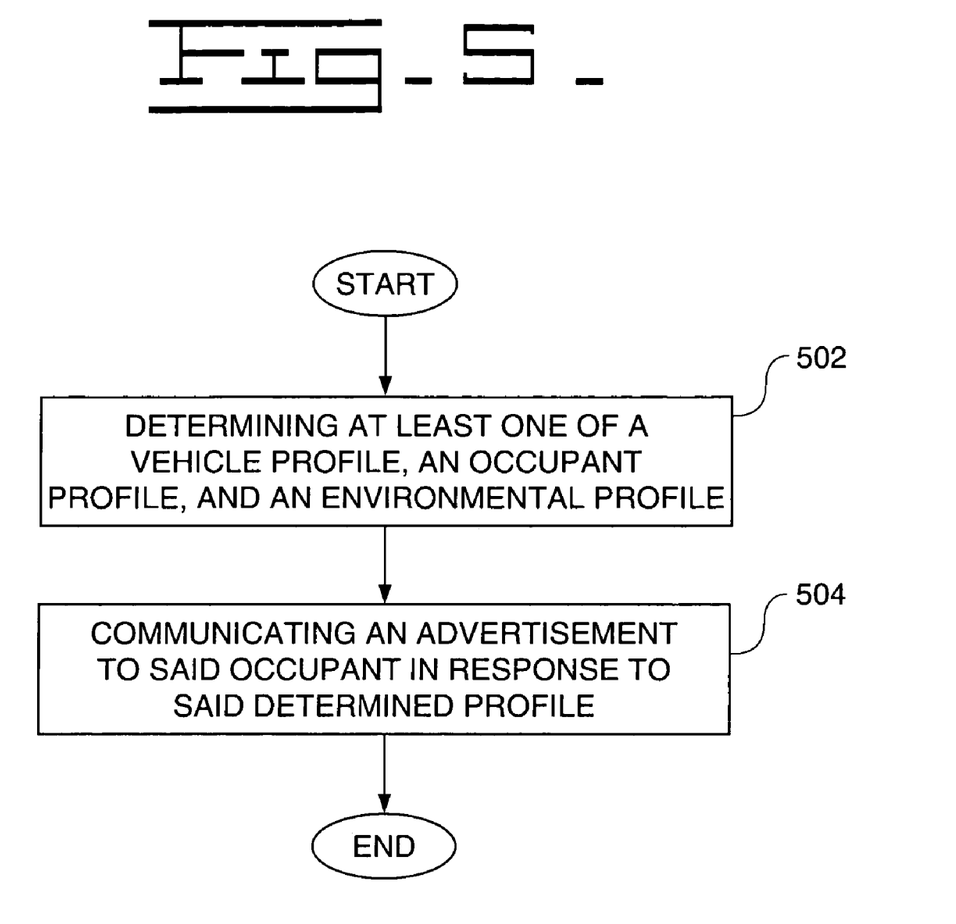
FIG. 5 illustrates another method of providing advertisements to an occupant of a mobile machine.

FIG. 5 illustrates another embodiment of the present invention associated with a method of providing advertisements to an occupant of a vehicle. In a first control block 502, at least one of a vehicle, occupant, and environmental profile are determined. In a second control block, 504, an advertisement is communicated to the occupant in response to the determined profile.

A profile may include information associated with the vehicle, occupant, and/or environment. The profile may include preferences identified by one or more occupants. For example, an occupant profile may include information or characteristics regarding the type of lodging the occupant prefers to stay in, or the characteristics of a hotel the occupant prefers (e.g., indoor pool, king size bed, room service1, etc.). The profile information may include preferred restaurants, types of restaurants, or specific food types desired. Other profile characteristics include desired destination characteristics, predicted vehicle path characteristics, desired activity characteristics, weather characteristics, and/or fatigue characteristics. The vehicle profile may include preferred products/services for the vehicle, e.g., preferred gasoline type, oil type, service centers, capabilities (e.g., service centers with food marts, etc.). The profiles may also include occupant communication triggers. An occupant communication trigger is simply the trigger, or event, that should occur in order to cause an advertisement to be presented to the occupant. For example, a trigger may cause an advertisement to be identified based on the occupant profile, and then presented to the occupant. A trigger may include a time characteristic, a location characteristic, an event characteristic, a weather characteristic, and/or a season characteristic. The trigger may be established by the occupant and stored in memory, e.g., in the profile. For example, the trigger could be a time (11:30 a.m.). And the trigger could be correlated with restaurants, such that at 11:30 a.m., the processor could identify advertisements with restaurants and communicate them to the occupant. The profile may be used to identify what type of restaurants the occupant prefers and identify and communicate appropriate advertisements. The trigger could include multiple characteristics. For example, the trigger may be activated when data indicates bad weather is ahead, impacting the planned path of the vehicle, and the weather will be encountered past 7:00 p.m. The trigger may activate and identify restaurants and/or lodging based on the occupant profiles and then communicate the advertisements to the occupants. The data used to activate the trigger may be vehicle status data, occupant status data, and/or environmental status data. Time, date, and planned (or predicted) vehicle path may be included in one or more of the vehicle, occupant, and environmental data.

In one embodiment, the profiles may be manually activated by the occupant via the user interface.

The above functions are described in more detail below.

INDUSTRIAL APPLICABILITY

The methods and systems described herein may be used to perform a wide variety of functions. For example, a vehicle operator could be alerted when a repair or a scheduled maintenance is needed or recommended. Ideally, the alerts, advertisements, and other messages can be delivered automatically when needed, based on time, engine status, and/or other changing conditions, instead of requiring the operator to specifically request them or initiate additional information input.

Individualized advertisements, a preferred dealer for performing the recommended repair or maintenance for example, could be presented to a driver. The address to the nearby such dealer, even possibly including driving directions to that dealer, phone number, etc., could be given. In alternate embodiments of the invention, geographical position of the vehicle need not be determined, or if it is determined it need not be used. These embodiments could be used to advertise a particular brand of merchandise or service obtainable nationwide for example.

To illustrate, an advertisement may be communicated to the vehicle operator when a low fuel, oil, or other engine fluid level is detected, advising the operator that it is time to buy more, and suggesting a particular brand for purchase. For another example, an advertisement may be communicated to the vehicle operator when it is determined that the vehicle is a certain age or has been operated a certain number of miles, suggesting the operator should go to a particular company's servicing center to have the vehicle serviced.

Any number of such advertisements tailored to the specific vehicle, changing characteristics of the vehicle, and/or location of the vehicle can be easily imagined. In all these cases, these advertisements could also include special offers, discounts, or other inducements to purchase a service or merchandise from a particular merchant or vendor.

These systems can be used with any mobile vehicle 14, an automobile or highway truck, for example that can be expected to travel long distances. They can also be used with a short-range vehicle, an off-road vehicle or earthmoving machine for example, expected to stay within a small distance from a particular location. In such a case location-specific resource data, i.e., information regarding products and services, can alternatively be provided as above, or input as desired, or even implanted in the memory 30 at time of manufacture.

Generally, the ECM 16 will incorporate an onboard computer for performing the method, which may be stored in a portion of the memory 30. Alternatively, the method may be performed partially or entirely by an off-site or central computer facility. In that case, the vehicle status data could be transmitted to the computer facility via the receiver/transceiver 22 or Internet for example, and the computer facility could likewise transmit the message to the user interface 12 in the vehicle 14.

While the invention could be used with no direct user input, user-specific information including user preferences and/or special needs could be input via the input device 20 (or embedded in the memory 30 when the system is installed in the vehicle 14) to be used in determining the recommended course of action and/or the preferred location.

For example, a user might input data specifying a certain class or other criterion of a hotel for lodging, or particular brands of fuel and/or vehicle replacement parts, or preferred locations, or even trade-off preferences, such as how important product price is compared with distance to be traveled. Home location or ultimate destination for a particular trip could be input as well, so the ECM 16 could choose a preferred location based on expected travel routes, instead of or in addition to present location. Thus, the vehicle's "geographical position" determined might be an expected instead of and/or in addition to a current location.

The need trigger could be the result of inputs from the engine 26, transmission, electronics system, fuel system, and/or other systems associated with the vehicle. For example, determining the need trigger (S1) could include detection of an imminent need for replacement or evidence of wear of a particular part, or time or mileage since a particular part was installed, or an indication that a particular engine 26 fluid has reached a low level, or even a determination, from physiological feedback or driving performance for example, that a driver is becoming fatigued and should obtain lodging. Other vehicle-specific characteristics could be used as well, for example information regarding the type of vehicle engine 26, vehicle options, other onboard equipment, or even personal data regarding the vehicle owner or operator.

Determining the recommended course of action (S2) is accomplished by comparing the nature of the need trigger against a list of preselected courses of action for that need. Determining the vehicle position (S3) is accomplished by input from the GPS, preprogrammed position data, and/or user input via the user interface 12 for example.

Determining the preferred location (S4) for accomplishing the recommended course of action is accomplished by matching the resource data in the database 32 against the recommended course of action. A database 32 entry for a specific resource could specify what needs can be satisfied and/or what courses of action may be accomplished at that location for example. In this way possibilities for the preferred location can be selected, and a final preferred location or list of preferred locations can be chosen for example based on the geographical position (current or expected) and any user-specific information or other preferences, which can also be stored in the memory 30.

Finally, the ECM 16 constructs a message for informing the user of the need, the recommended course of action, and/or the preferred location, and sends the message (S5) to the user interface 12 for visual, auditory, or even tactile communication. The message can be in the form of an advertisement. Accordingly, the recommended course of action can include a suggestion to purchase a specific commercial brand of merchandise to meet the need, and/or a suggestion to obtain a service from a specific merchant to meet the need. Alternatively, the message can be in non-advertisement form, providing general advice and/or directions to the vehicle occupant for meeting the need.

Figure 3:
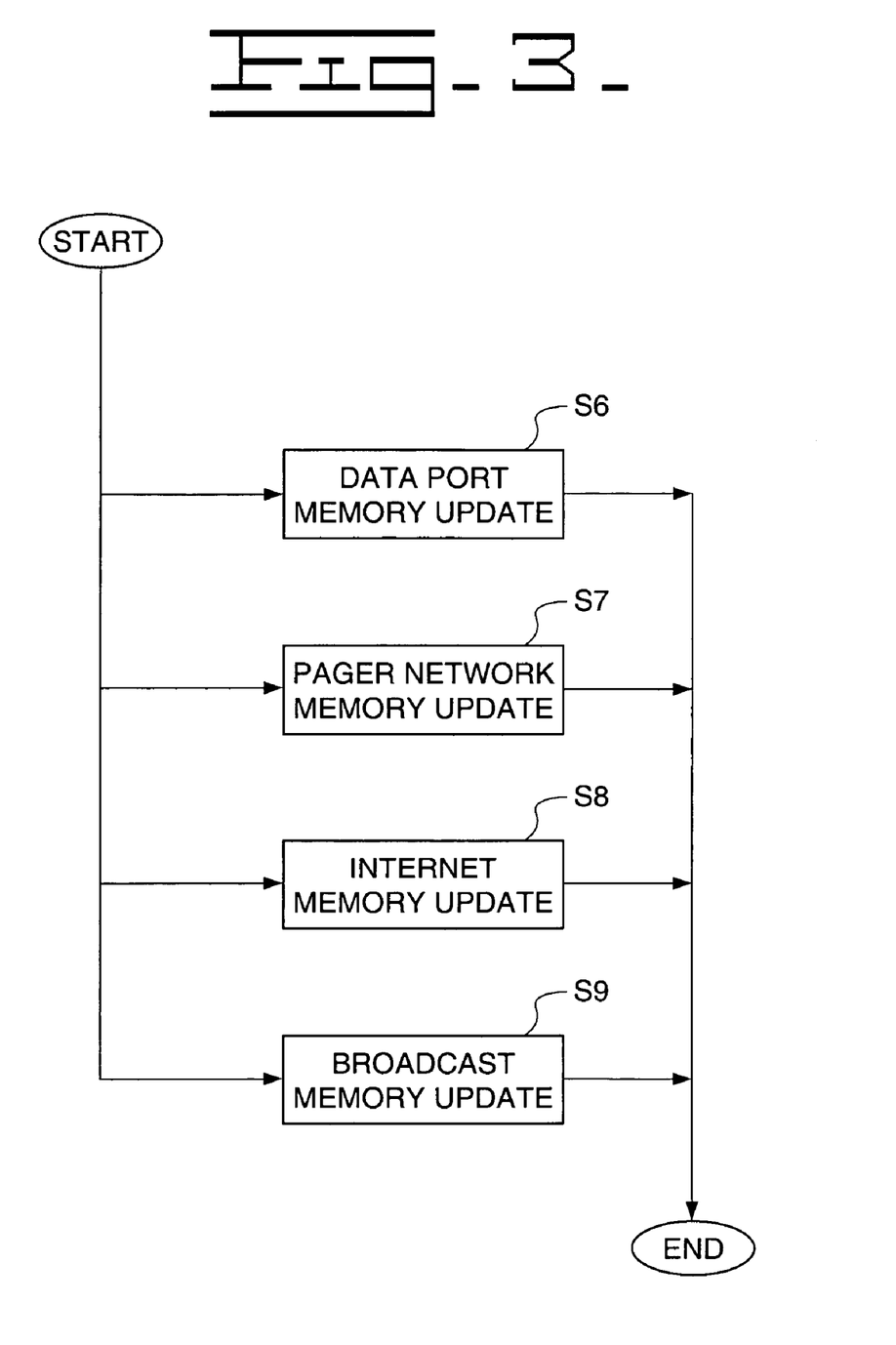
FIG. 3 illustrates possible data update steps for one or more embodiments of the method of the invention.

Merchants may load updated resource data via (S6) the input port 24 when the vehicle 14 arrives for maintenance or product installation for example. Updated resource data may also be received (and the resource data updated) periodically, or on demand, from (S7) a paging network, from (S8) the Internet, from (S9) broadcasting stations, etc.

The invention is not limited to the disclosed embodiments. For example, the receiver/transceiver 22 can be a single device or a number of receiver and/or transmitter combinations for the same mobile vehicle 14. For example, there may be a separate antenna for receiving GPS data, and another for receiving updated resource data. Of course, the operation can be used with no outgoing transmissions, in which case only an antenna or antennas are needed if necessary to obtain vehicle position data.

Accordingly, while the invention has been illustrated and described in detail in the drawings and foregoing description, such illustration and description are to be considered illustrative or exemplary and not restrictive; other variations to the disclosed embodiments can be made by those skilled in the art while practicing the claimed invention from a study of the drawings, the disclosure, and the appended claims.

What is claimed is:

1. A method of providing advertisements to an occupant of a mobile vehicle comprising the steps of:
   determining at least one of a vehicle status data, an occupant status data, or an environmental status data; and
   communicating an advertisement to said occupant in response to said at least one vehicle status data, occupant status data, or environmental status data, the advertisement including an inducement to purchase at least one of a service or merchandise.

2. A method, as set forth in claim 1, further comprising the step of determining a recommended course of action in response to said at least one vehicle status data, occupant status data, and environmental status data.

3. A method, as set forth in claim 2, wherein the step of communicating said advertisement to said occupant further includes the step of communicating said advertisement to said occupant in response to said recommended course of action.

4. A method, as set forth in claim 3, wherein the step of communicating said advertisement further comprises the step of identifying said advertisement in response to said recommended course of action.

5. A method, as set forth in claim 4, wherein the step of identifying said advertisement includes the steps of:
receiving a plurality of advertisements; and
selecting said advertisement from said plurality of advertisements in response to said recommended course of action.

6. A method, as set forth in claim 5, wherein the step of receiving said plurality of advertisements further includes the step of receiving said plurality of advertisements from at least one of an on-board repository, an off-board repository, or a plurality of separate off-board sources.

7. A method, as set forth in claim 4, wherein the step of identifying said advertisement includes the steps of:
requesting information associated with said recommended course of action;
receiving at least one advertisement in response to said information request; and
selecting said advertisement from said at least one received advertisements.

8. A method, as set forth in claim 7, wherein the step of receiving said plurality of advertisements further includes the step of receiving said plurality of advertisements from at least one of an on-board repository, an off-board repository, and a plurality of separate off-board sources.

9. A method, as set forth in claim 4, wherein the step of identifying said advertisement further includes the steps of:
establishing a predicted path of said vehicle; and
identifying said advertisement in response to said recommended course of action and said predicted vehicle path.

10. A method, as set forth in claim 1, wherein said environmental status data includes weather information and further comprising the steps of:
establishing a predicted path of said vehicle;
establishing a recommended course of action in response to said predicted vehicle path and said weather information; and
identifying said advertisement in response to said recommended course of action and said predicted vehicle path.

11. A method, as set forth in claim 10, wherein said advertisement is related to at least one of a restaurant, a lodging, or a vehicle service center.

12. A method, as set forth in claim 1, wherein said environmental status data includes road condition information and further comprising the steps of:
establishing a predicted path of said vehicle;
establishing a recommended course of action in response to said predicted vehicle path and said road condition information; and
identifying said advertisement in response to said recommended course of action and said predicted vehicle path.

13. A method, as set forth in claim 12, wherein said road condition information includes at least one of a traffic characteristic, a detour characteristic, or a vehicle service center location characteristic.

14. A method, as set forth in claim 4, wherein the step of identifying said advertisement further comprises the step of identifying said advertisement in response said recommended course of action and an occupant response to a prior advertisement.

15. A method, as set forth in claim 1, further comprising the step of tracking a response by said occupant to said communicated advertisement.

16. A method, as set forth in claim 1, further comprising the step of tracking a purchase by said occupant in response to at least one of a vehicle identifier and an occupant identifier.

17. A method of providing advertisements to an occupant of a mobile vehicle comprising the steps of:
determining at least one of a vehicle status data, an occupant status data, and an environmental status data; and
communicating an advertisement to said occupant in response to said at least one vehicle status data, occupant status data, and environmental status data,
wherein said advertisement is customized to one of said vehicle and said occupant in response to a prior purchase.

18. A method, as set forth in claim 17, wherein said customized advertisement includes an additional discount based on said prior purchase.

19. A method of providing an advertisement to an occupant of a mobile vehicle, comprising the steps of:
determining at least one of a vehicle profile, an occupant profile, or an environment profile;
communicating said advertisement to said occupant in response to said at least one of said vehicle profile, said occupant profile, or said environment; and tracking a purchase by said occupant.

20. A method, as set forth in claim 19, further including:
determining a recommended course of action in response to said at least one vehicle profile, occupant profile, and environment profile;
wherein the step of communicating said advertisement further comprises the step of identifying said advertisement in response said recommended course of action and a prior purchase.

21. A method, as set forth in claim 19, further comprising the step of establishing an occupant communication trigger.

22. A method, as set forth in claim 21, further comprising the step of establishing at least one of a vehicle status data, an occupant status data, or an environment status data.

23. A method, as set forth in claim 22, wherein the step of communicating said advertisement further includes the step of communicating said advertisement to said occupant in response to at least one of said vehicle profile, said occupant profile, or said environment profile, said communication trigger, and at least one of said vehicle status data, said occupant status data, or said environment status data.

24. A method, as set forth in claim 22, wherein said communication trigger includes at least one of a location characteristic, a time characteristic, an event characteristic, a weather characteristic, a season characteristic, or a road condition characteristic.

25. A method, as set forth in claim 19, wherein said occupant profile includes at least one of a desired lodging characteristic, a desired destination, a predicted path of said vehicle, a desired restaurant characteristic, a desired food characteristic, a desired activity characteristic, a weather characteristic, or a fatigue characteristic.

* * * * *